March 9, 1948.  R. PENN  2,437,551
AUTOMATIC CONTROL SYSTEM
Filed Feb. 25, 1944  2 Sheets-Sheet 1

INVENTOR.
Ralph Penn,
BY Bair & Freeman
Attys.

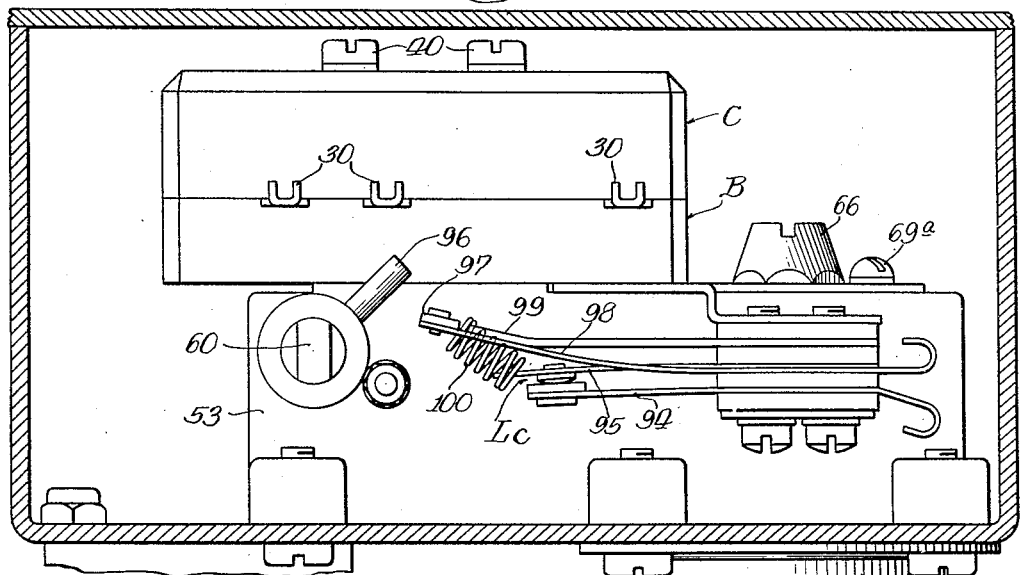
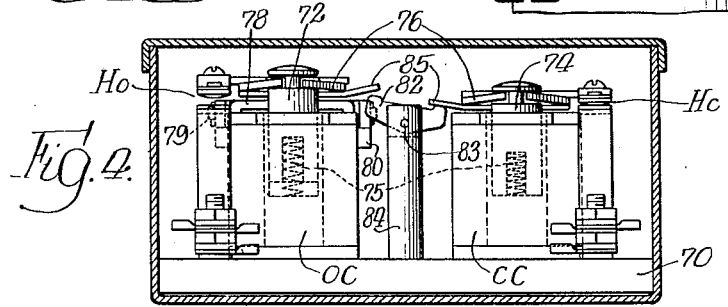
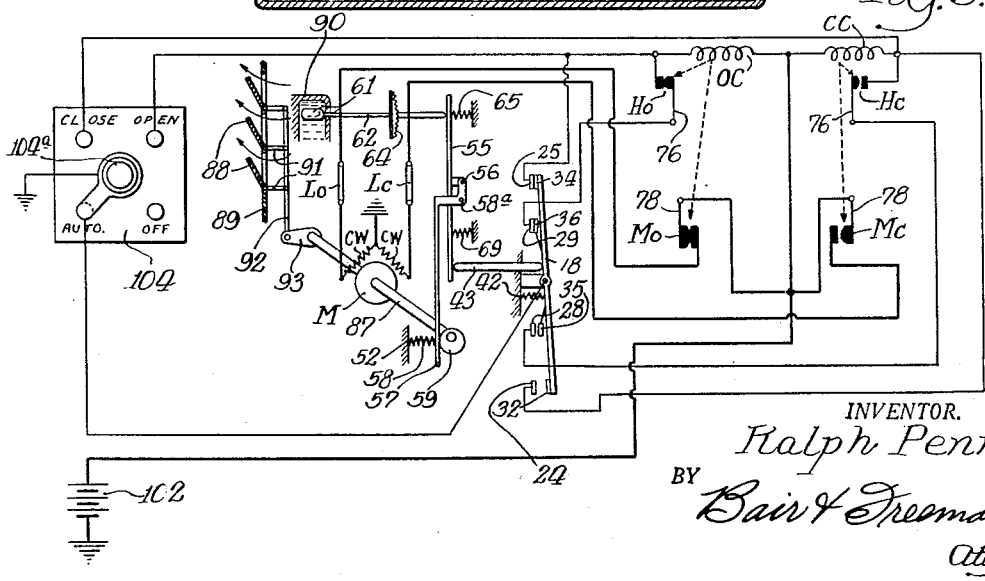

Patented Mar. 9, 1948

2,437,551

UNITED STATES PATENT OFFICE 2,437,551

AUTOMATIC CONTROL SYSTEM

Ralph Penn, Goshen, Ind., assignor to Penn Electric Switch Co., Goshen, Ind., a corporation of Iowa Application February 25, 1944, Serial No. 523,839

3 Claims. (Cl. 318—32)

My present invention relates to an automatic control system which is particularly adapted for controlling the cowl flaps of an airplane engine in accordance with the temperature of the engine, the system however being capable of use in connection with various other types of control installations and for conditions other than temperature.

One object of the invention is to provide a cowl flap control having an electric motor for opening or closing the cowl flaps and temperature responsive means for effecting operation of the opening and closing apparatus and modulating the control between closed and open positions, the structure of the control being comparatively simple and adaptable for ease of manufacture.

Another object is to provide temperature responsive means responding to the temperature of an engine and associated with a cowl flap operating motor through the medium of a follow-up switching mechanism for relays that control the motor and its direction of rotation depending upon whether the temperature is rising or falling.

Still another object is to provide a manual switching means operable by the pilot so that either automatic or manual control can be had, with the cowl flap motor stopped in any position or operated toward open or closed position at will.

A further object is to provide a pilot switching means operable in response to both engine temperature and the position of the control motor, and energizing opening and closing coils of a relay which controls the energization and direction of rotation of the control motor.

Still a further object is to provide a holding contact arrangement for the relay coils which eliminates the possibility of the motor control contacts bouncing or chattering due to vibration of the control device as possible when mounted on an airplane or the like.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 3 is an enlarged sectional view on the line 3—3 of Figure 1 showing a side view of the switch unit in Figure 2 and a side view of a limit switch associated with the control device.

Figure 4 is a sectional view on the line 4—4 of Figure 1 showing particularly a mechanical interlock between a pair of relays in the control device, and Figure 5 is a diagrammatic view of the complete system.

Figure 1:
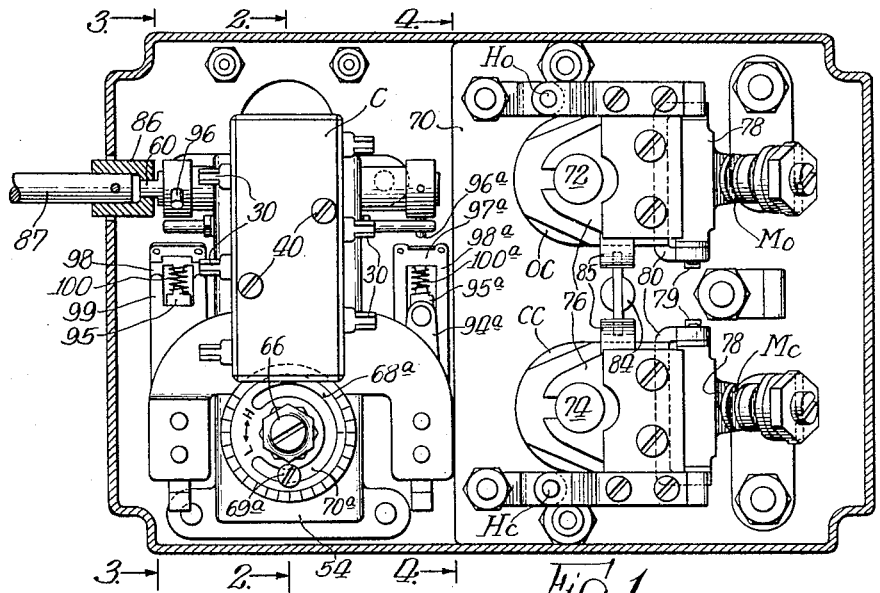
Figure 1 is a plan view of a control structure used in a cowl flap system with a casing thereof shown in section.

My control structure used in the automatic system herein disclosed includes a housing 50 having a cover 51 with the various mechanism of the control structure contained therein. The mechanism includes a base 52 secured to the bottom of the housing 50 and having side walls 53 extending upwardly therefrom and connected together at their tops by a top wall 54. A switch unit including a base B and a cover C is mounted on the top wall 54 by a pair of screws 40.

The switch unit will be here briefly described whereas it is fully described in my copending application Serial No. 514,481, filed December 16, 1943, now Patent No. 2,434,954, issued January 27, 1948. Mounted in terminal straps 22 and 26 are stationary contacts 24 and 25 and stationary contacts 28 and 29. A pair of brackets 12 are secured to the base B and have depending flanges 15 between which is riveted a leaf spring 16. A switch arm A comprising a pair of elements 18 having upwardly extending flanges 19 is provided and these flanges are riveted to the upper end of the leaf spring 16. The leaf spring thereby serves as a pivotal mounting for the switch arm and a current conductor thereto thus eliminating pigtail connections.

The switch arm A has outer contacts 32 and 34 for coaction with contacts 24 and 25 and has inner contacts 35 and 36 for coaction with contacts 28 and 29. The contacts 35 and 36 are carried by leaf springs 37 which in turn are supported on the switch arm A by means of rivets 38.

The arm sections 18 are provided with enlarged openings 39 for the contacts 35 and 36. The terminal brackets 22 and 26 and likewise the brackets 12 are provided with terminals 30 exterior of the base B as shown in Figures 1 and 3 with which electric connections may be made for connecting the switch unit in the system as shown in Figure 5.

Figure 2:
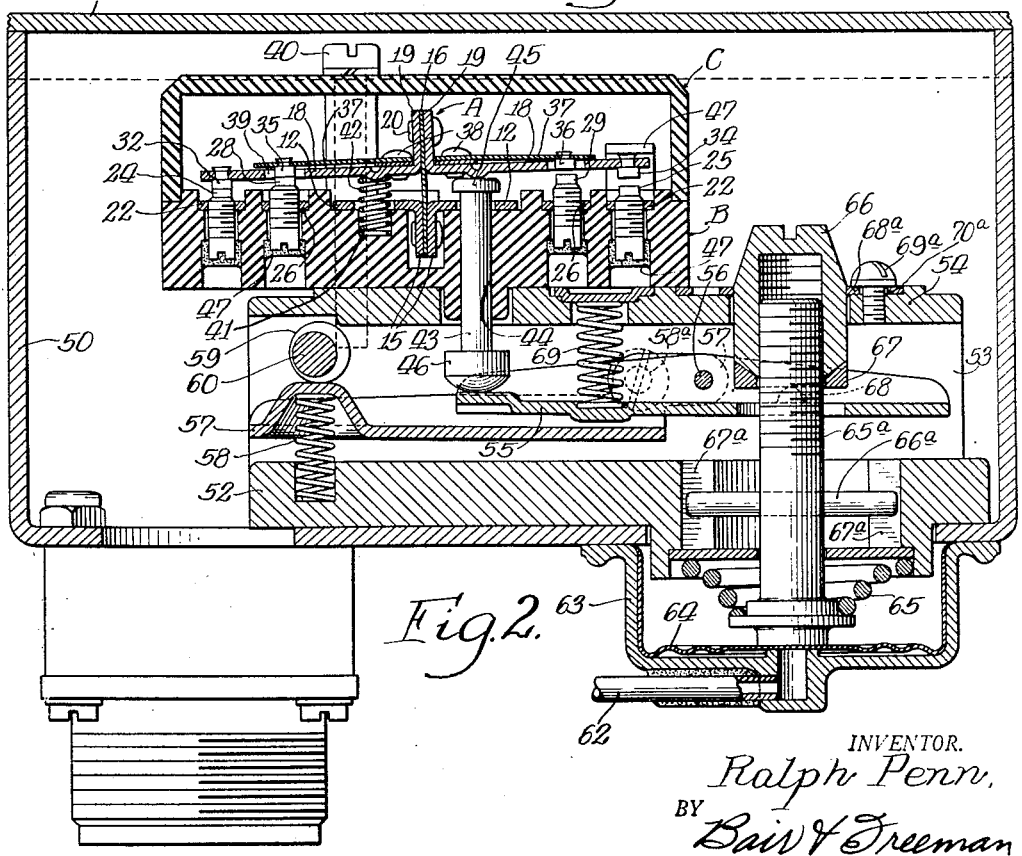
Figure 2 is an enlarged sectional view on the line 2—2 of Figure 1 which illustrates a switch unit and elements of the control structure that operate it.

A spring 42 tends to swing the switch arm A clockwise in Figure 2. A pin 43 is slideable in an opening 44 of the base B for engaging the arm at a head 45 of the pin and swinging the arm counterclockwise. The pin 43 has a second head 46 formed of insulation to be engaged by a secondary lever 55 for this purpose.

The lever 55 is pivoted at 56 to a primary lever 57 which in turn is pivoted at 58a to a stationary pivot mounted in the side walls 53.

The lever 57 is biased to move upwardly at its left hand end by a spring 58 and is limited in its movement by a cam 59 on a shaft 60. The pivot 56 is thereby held in a fixed position depending on the position of the cam.

Cooperating with the cam 59 in positioning the pin 43 is a temperature responsive means including a capillary bulb 61 connected by a capillary tube 62 to a power element comprising a housing 63 and a diaphragm 64. Opposing pressure against the diaphragm 64 from the capillary tube 62 is a load spring 65 to preload the diaphragm to a predetermined degree. The knob 66 bears against a washer 67 which in turn engages a pair of projections 68 on the lever 55. An adjustment of 66 alters the position of the lever 55 and hence, diaphragm 64 assumes a new position to operate the pilot switch. Therefore, the setting is changed. Opposing downward pull of the washer 67 is a spring 69. Accordingly the spring keeps the projection 68 engaged with the washer and the spring 65 moves the washer 67 downwardly whenever the hydraulic pressure reduces between the housing 63 and the diaphragm 64 of the power element. Any increase in pressure compresses the spring 65 and permits the spring 69 to lower the left end of the lever 55 thereby permitting the pin 43 to be lowered by the spring 42 to reverse the position of the pilot switch unit.

Referring to Figure 4 a base member 70 is mounted in the housing 50 and mounted thereon is a relay including a pair of coils, one of which I shall term an opening coil OC and the other a closing coil CC. Plungers 72 and 74 are mounted therein and normally held raised by springs 75. When either coil is energized its plunger is drawn downwardly by the electromagnetic pull of the coil involved.

Bell cranks having horizontal arms 76 and vertical arms 78 are pivoted at 79, the pivots being supported by stationary brackets 80 (see Fig. 1). Contacts for energizing the motor M so that it rotates in a cowl flap opening direction are provided at Mo and for rotating the motor in a cowl flap closing direction at Mc. Each set of contacts has one stationary contact and one movable contact, the movable contacts being mounted on the bell crank arms 78 which extend away from the observer in Figure 1. Similarly, holding contacts Ho for the opening direction, and Hc for the closing direction are mounted on the bell crank arms 76 of the respective relay coils OC and CC. With this arrangement the contacts Mo and Ho are closed whenever the coil OC is energized and the contacts Mc and Hc are closed whenever the coil CC is energized.

A mechanical interlock is provided between the two bell cranks in the form of a rocker 82 pivoted at 83 on a stationary post 84. The bell cranks are provided with finger-like extensions 85 so that when one extension engages the rocker it will be tipped in one direction and when the other extension engages the rocker it will be tipped in the opposite direction. It is shown tipped clockwise in Figure 4 so that any energization of the coil OC while the coil CC is still energized will not permit the plunger 72 to be moved downwardly by the coil OC as it takes more current to thus move it than to hold it after it is moved. The plunger 74 therefore being down overcomes the pull of the coil OC on the plunger 72 through the rocker connection 82. This avoids energizing the motor M for both forward and reverse operation at the same time as will hereinafter appear.

The shaft 60 is connected by a coupling 86 with a cowl flap operating shaft 87. The shaft 87 is driven by the motor M through suitable step down gearing mechanism and may be connected with cowl flaps 88 of a cowling 89. The cowling surrounds an internal combustion engine which is shown at 90 and the capillary bulb 61 may be responsive to the temperature of the engine by being located in the water jacket as shown in Figure 5. The cowl flaps 88 have operating arms 91 connected by a link 92 and a lever 93 to the shaft 87.

The motor M has an opening winding OW and a closing winding CW which are alternately energized for moving the flaps toward opened or closed positions respectively. Limit switches for the open and closed positions of the flaps are provided at Lo and Lc respectively and these are similar in characteristics but oppositely mounted as shown in Figure 1.

For details of the switch reference is made to Figure 3 wherein the switch Lc is shown and consists of cooperating contacts mounted on leaf springs 94 and 95. This type of switch is shown in full detail and claimed in the copending application of Leland B. Wagner Serial No. 514,483, filed December 16, 1943. The leaf springs are under tension so as to normally be engaged at the contacts but may be separated by clockwise rotation of the shaft 60 which results in a pin 96 thereof engaging a strip of insulation 97 on a leaf spring 98 to move the leaf spring from a stationary stop bar 99 downwardly. A toggle spring 100 is interposed between the left end of the leaf spring 95 and the cross bar 97 so that when it passes over center it will snap the contact on the spring 95 away from that on the spring 94 thus opening the motor circuit.

The parts of the switch Lo corresponding to the switch Lc are given similar reference numerals 94a to 100a respectively.

The various elements of my control system are wired together as shown in Figure 5 with a source of current supply such as a battery 102 being provided for supplying current thereto. A switch 104 is provided in the pilot's compartment having four different positions as shown whereby the pilot may selectively place the control system in automatic operation, or energize the motor for opening the cowl flaps or for closing them, or stop the flaps at any desired position by movement of the switch to "off" when such desired position is reached. The switch 104 has a control knob 104a.

*Practical operation*

In the operation of my cowl flap control system, the parts assume the position of Figure 2 when the engine is cold and the temperature is down. In that event the closing contacts 24, 32, 28 and 35 are closed for effecting a closure of the cowl flaps 88 to their limit of movement as determined by the limit switch Lc. The flaps are being opened in Figure 5. As the engine temperature rises it will act on the diaphragm 64 to compress the spring 65 and this is the position that is illustrated in this figure. The rise in temperature rocks the lever 55 clockwise so as to permit the contacts 29 and 36 to close and then the contacts 25 and 34 to close. The contacts 29 and 36 do not produce any effect because at that time the contacts Hc are open. When the contacts 25 and 34 engage, then current may be traced from the battery 102 through the coil OC and the contacts 25 and 34, through the switch blade 19 and the switch 104 to ground, provided the switch is in automatic position at that time.

Accordingly the opening winding OW of the motor M is energized so as to move the flaps 88 toward open position. This results in the cam 59 swinging the lever 57 clockwise and thereby through the pin 43 opening the contacts 25 and 34 and then the contacts 29 and 36. The opening of the contacts 29 and 36 results in deenergization of the opening coil OC so that the motor M is stopped. Thus we have a follow-up movement of the motor with respect to the temperature responsive means so that the cowl flaps are effectively modulated between wide open and fully closed positions in accordance with the temperature of the engine.

When it is desirable to manually open or close the flaps or move them toward either position the pilot can manipulate the switch 104, setting it for "open" or "closed" or can stop the flaps in any position desired by setting the switch at "off." The control device is thus subject to the wishes of the pilot at all times.

My control structure has a number of advantages, among which are the positive movement of the motor M in one direction or the other automatically by the use of the holding contacts Ho and Hc which hold the relay coil circuits even though the contacts of the pilot switch close only momentarily or chatter. Further reduction of erratic operation of the motor M is had because the pilot switch unit gives vibration-free operation due to the balanced character of the switch arm A even when vibration is affecting the control structure as a whole.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. For use in conjunction with a control shaft, means for operating said shaft comprising a reversing electric motor, follow-up mechanism associated therewith, and control mechanism for said motor comprising a pilot switch, a condition responsive means responding to a condition controlled by said control shaft, dual means for operating said pilot switch from said control shaft and from said condition responsive means, relays operated by said pilot switch in opposite positions thereof and controlling said motor contacts as to its rotation in one direction or the other, said pilot switch having holding contacts for said relays, said pilot switch having relay operating contacts for operating the relays, said holding contacts being closed before the pilot switch energizes the relays by closure of said relay operating contacts and the relays being deenergized by opening of said holding contacts.

2. For use in conjunction with a control shaft, means for operating said shaft comprising a reversing electric motor, follow-up mechanism associated therewith, and control mechanism for said motor comprising a pilot switch, a condition responsive means responding to a condition controlled by said control shaft, dual means for operating said pilot switch from said control shaft and from said condition responsive means, relays operated by said pilot switch in opposite positions thereof and controlling said motor contacts as to its rotation in one direction or the other, said pilot switch having holding contacts for said relays, said relays having holding contacts in series therewith, said pilot switch having relay operating contacts for operating the relays, said holding contacts of said holding switch being closed before the relay operating contacts thereof and the relays being deenergized by the opening of said holding contacts of said pilot switch.

3. For use in conjunction with a control shaft, means for operating said shaft comprising a reversing electric motor, follow-up mechanism associated therewith, and control mechanism for said motor comprising a pilot switch, a condition responsive means responding to a condition controlled by said control shaft, dual means for operating said pilot switch from said control shaft and from said condition responsive means, relays operated by said pilot switch in opposite positions thereof, a mechanical interlock between said relays preventing operation of one when the other one is energized, said relays controlling said motor contacts as to the rotation of the motor in one direction or the other, said pilot switch having holding contacts for said relays, said relays having holding contacts in series therewith, said pilot switch having relay operating contacts for operating the relays, said holding contacts of said holding switch being closed before the relay operating contacts thereof and the relays being deenergized by the opening of said holding contacts of said pilot switch.

RALPH PENN.

REFERENCES CITED

The following references are of record in the file of this patent:

UNITED STATES PATENTS

| Number | Name | Date |
|---|---|---|
| 1,406,377 | Harvey | Feb. 14, 1922 |
| 1,954,142 | Moffett | Apr. 10, 1934 |
| 2,056,287 | Manley | Oct. 6, 1936 |
| 2,069,516 | Baker | Feb. 2, 1937 |
| 2,314,937 | Hannon | Mar. 30, 1943 |
| 2,333,066 | Yeida | Oct. 26, 1943 |
| 2,334,967 | Thomas | Nov. 23, 1943 |
| 2,348,454 | Cunningham | May 9, 1944 |

FOREIGN PATENTS

| Number | Country | Date |
|---|---|---|
| 538,182 | Great Britain | July 24, 1941 |
| 377,072 | Italy | Dec. 7, 1939 |